United States Patent [19]

Stafstrom

[11] B 3,992,756

[45] Nov. 23, 1976

[54] SEPARABLE FASTENER

[75] Inventor: Gustave T. Stafstrom, Plymouth, Conn.

[73] Assignee: Waterbury Buckle Company, Waterbury, Conn.

[22] Filed: Dec. 13, 1974

[21] Appl. No.: 532,476

[44] Published under the second Trial Voluntary Protest Program on February 3, 1976 as document No. B 532,476.

[52] U.S. Cl. ................................. 24/75; 24/236
[51] Int. Cl.² .................. A44B 11/25; A44B 13/02
[58] Field of Search ............ 24/75, 201 D, 201 HE, 24/201 S, 265 BH, 265 SH, 231, 236, 225, 226

[56] References Cited
UNITED STATES PATENTS

| | | | |
|---|---|---|---|
| 237,304 | 2/1881 | Mills | 24/75 |
| 241,010 | 5/1881 | Hayden | 24/236 |
| 621,676 | 3/1899 | Hubbard | 24/265 SH |
| 681,264 | 8/1901 | Robinson | 24/236 UX |
| 705,620 | 7/1902 | Specht | 24/75 UX |
| 776,229 | 11/1904 | Fritsch | 24/75 |
| 1,481,165 | 1/1924 | Wells | 24/236 |
| 1,821,839 | 9/1931 | Kerngood | 24/75 |
| 3,688,349 | 9/1972 | Benk | 24/236 X |

*Primary Examiner*—Donald A. Griffin
*Attorney, Agent, or Firm*—McCormick, Paulding & Huber

[57] ABSTRACT

A separable fastener of the hook and eye type is designed to allow easy and rapid joining of the two fastener parts and to inhibit inadvertent separation of the parts after joining while nevertheless enabling the parts to be readily unfastened from one another when such unfastening is desired. Contributing to these results is the use in the hook member of a novel spring detent which yieldingly retains the eye member in its fully hooked condition with the hook member.

6 Claims, 3 Drawing Figures

SEPARABLE FASTENER

BACKGROUND OF THE INVENTION

This invention relates ot a two-part separable fastener, and deals more particularly with such a fastener of the hook and eye type.

Hook and eye fasteners are well known and generally have the advantage of being of simple construction and operation easily understood by almost anyone, and they are usually capable of being fastened and unfastened with little effort, skill or time being required. A common drawback of such fasteners, however, is the fact that they are often quite subject to being accidentally opened or unfastened as the result of natural movements and forces imposed on the fastener during use. To forestall such accidental opening, some prior art constructions have included various sorts of guards or retainers for holding the eye to the hook, but these guards or retainers usually complicate the construction and operation of the fastener and diminish its usefullness as a simple mechanism requiring little time, skill or effort in either the fastening or unfastening procedures.

A general object of this invention is, therefore, to provide a hook and eye type separable fastener which is as easy to fasten and unfasten as the most simple type of hook and eye but which nevertheless includes a device for holding the eye to the hook to resist undersired unfastening of the parts due to loads imposed thereon during normal use. Another object is to provide such a fastener which may be manufactured at relatively low unit cost.

The fastener of this invention may be put to many different types of uses. One use to which it is particularly well suited is that of a life jacket buckle where the user of the jacket may, in an emergency situation, find it necessary to fasten the fastener as quickly as possible while in an excited state of mind and where it is important that the fastener remain fastened after fastening despite the fact that the wearer of the jacket may be moving strenuously.

SUMMARY OF THE INVENTION

The invention relates to a separable fastener of the hook and eye type and includes a hook member formed of sheet material and having a hook partially cut from the sheet material and pressed outwardly from the remainder thereof to leave an opening in the base of the hook member underlying the hook. A spring detent member is fixed to the base of the hook member and extends into the opening beneath the hook to cooperate with the eye of an eye member received on the hook. That is, the spring detent member includes a free end portion which in the normal relaxed condition of the member is spaced from the hook by only a small distance so that the eye in moving onto or off of the hook needs to resiliently displace the spring detent member away from the hook to permit it to pass past the detent. Two cam surfaces are provided on the detent for this purpose. The invention also resides in the way in which the spring detent member is made from a single strip of spring material and the manner in which it is fastened to the hook member.

DETAILED DESCRIPTION OF THE PREFERRED EMBODIMENT

Figure 1:
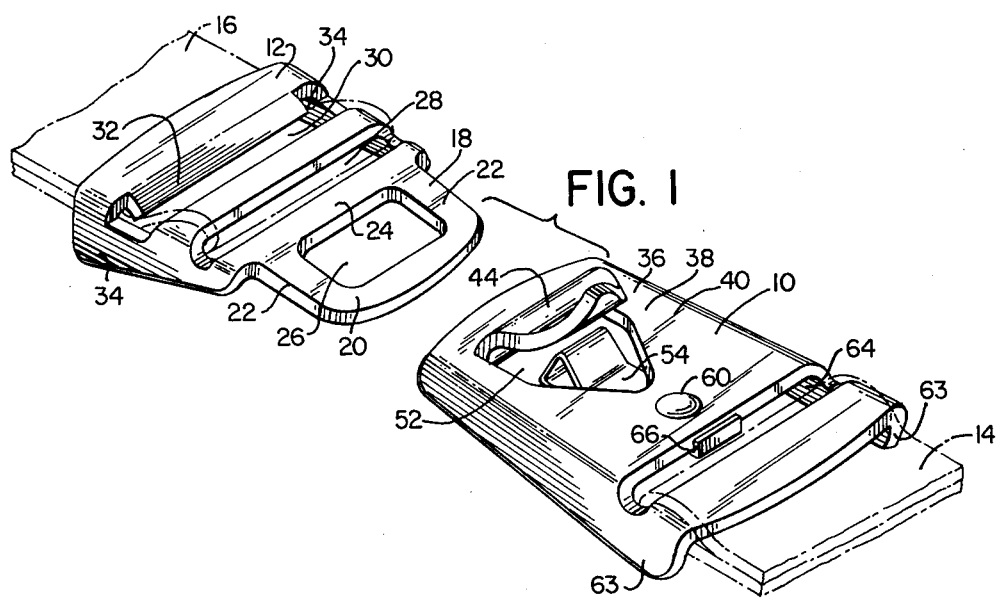
FIG. 1 is a perspective view showing a separable fastener embodying this invention with the two parts of the fastener being shown in their disengaged or unfastened condition.

Turning to the drawing, the three figures there presented show a separable fastener embodying this invention and consisting of a hook member 10 and an eye member 12 both of which are formed of sheet material, such as aluminum, brass or steel. The hook member 10 is adapted for connection to the end portion 14 of a flexible belt or strap and the eye member 12 is likewise adapted for connection to the end portion 16 of a flexible belt or strap. The end portions 14 and 16 may be parts of two separate straps or belts or may be the opposite ends of the same strap or belt. In any event, it will be understood that the end portions 14 and 16 are two which are to be releasably joined by the illustrated fastener.

Considering first the construction of the eye member 12, this member includes a forward portion defining an eye 18 comprised of a forward cross bar 20, two side bars 22, 22 and a rear cross bar 24, the four bars defining an eye opening 26. Behind the rear cross bar 24 is a first transverse slot 28 and rearwardly of the slot 28 is a second transverse slot 30. The slots 28 and 30 serve to receive the strap end portion 16 in the manner illustrated and the rear edge of the rear slot 30 is defined by a downwardly and transversely extending tongue 32 which resists slippage of the strap end portion 16 relative to the eye member when tension is applied between the strap and the eye member. Rearwardly of the eye 18 the eye member 12 includes two downwardly extending side skirts 34, 34 between which the strap end portion 16 is received.

Figure 3:
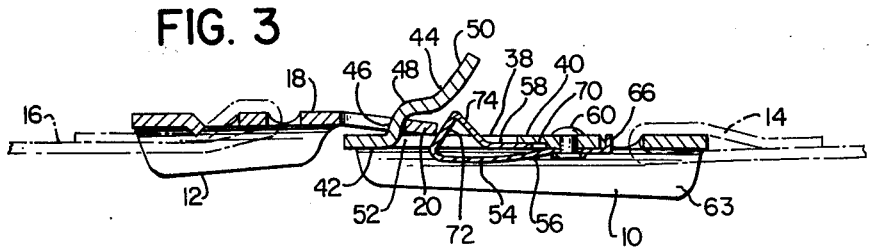
FIG. 3 is a vertical sectional view taken on the line 3—3 of FIG. 2.

Considering next the hook member 10, this member includes a forward portion 36 including a generally planar base 38 having a front surface 40 and, parallel thereto, a back surface 42. Fixed to and integral with the base 36 is a hook 44. As best seen in FIG. 3, the hook 44 has a forward end portion 46 which is connected with the base 38 and which extends generally upwardly from the base. Immediately following the forward portion 46 is an intermediate portion 48 which extends rearwardly generally parallel to the base 38, and following the intermediate portion 48 is a nose portion 50 which extends generally upwardly and rearwardly.

Figure 2:
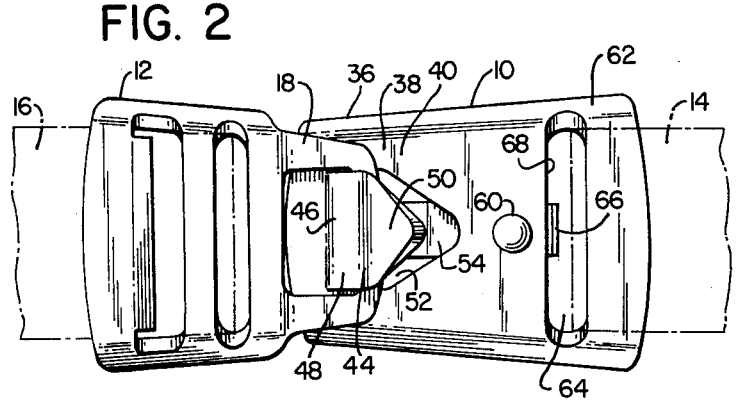
FIG. 2 is a plan view of the fastener of FIG. 1 but with the two parts of the fastener being shown in their fully hooked or fastened condition.

As best seen in FIG. 2, the forward portion 46 and intermediate portion 48 of the hook 44 have a transverse dimension closely fitting and only slightly less than the transverse dimension of the eye opening 26 of the eye member. The nose portion 50 in turn tapers from this transverse dimension to a relatively blunt medial point at its free end. The eye opening 26, however, has a longitudinal dimension very much larger than the thickness of the hook 50 and therefore the eye opening constitutes a relatively large and easily hit target for the hook during a fastening operation.

Immediately beneath the hook 44 of the hook member is an opening 52 passing through the base 38. From FIGS. 2 and 3, it will be obvious that the opening 52 and the hook 44 may be made by partially cutting the hook from an initially flat workpiece, the cut extending entirely around the outline of the hook except along the forward edge thereof, and then displacing the hook outwardly from the base 38 and bending it to the shape shown. Also, the intermediate portion 48 of the hook is spaced from the base 38 by a distance only slightly greater than the thickness of the eye cross bar 20 and less than the longitudinal dimension of said cross bar so as to limit rotation of the two members 10 and 12, relative to one another and about the axis of the cross bar when the two members are fastened, to a small range.

A spring detent member 54 is fixed to the hook member 10 rearwardly of the opening 52 and has a forward portion extending into the opening 52 for cooperation with the eye 18, when the eye is in its fully hooked condition with the hook member, to yieldingly resist displacement of the eye from the hook. As shown in FIG. 3, the illustrated detent member 54 consists of a strip of spring material which is bent upon itself to form two overlying legs, these being a backmost leg 56 and a frontmost leg 58. The backmost leg 56 is longer than the frontmost leg 58 and is fastened to the base 38 of the hook member by a rivet-type fastener 60 passing through both the base 38 and the leg 56.

In addition to its forward portion 36, the hook member 10 also includes a rear portion 62 which is in the nature of a continuation of the forward portion 36. Two side skirts 63, 63 are at opposite sides of the hook member and each extends along substantially the full length of both the forward portion 36 and rear portion 62. Included in the rear portion 62 is a transversely extending opening 64 for receiving the strap end portion 14. The backmost leg 56 of the spring detent member extends rearwardly of the rivet 60 and at its rear end is bent upwardly, as indicated at 66, so as to extend into the transverse slot 64 and to be engageable with the forward wall 68 of the slot to prevent rotation of the detent member about the axis of the rivet. Also, the back surface 42 of the base 38, adjacent the rear end of the opening 52, includes a groove 70 for receiving the free rear end portion of the frontmost leg 58, which leg 58 terminates short of the rivet 60.

Referring to FIG. 3, the frontmost leg 58 of the spring detent member is bent to define two cam surfaces for cooperation with the forward cross bar 20 of the eye 18 as the eye is moved onto and off of the hook 44. The first of these two cam surfaces is defined by a forward inclined portion 72 of the leg 58 which extends rearwardly and upwardly from the forward end of the backmost leg 54. The second of the cam surfaces is defined by another inclined portion 74 which extends downwardly and rearwardly from the top end of the portion 72.

The two portions 72 and 74 meet at a point which is spaced from the hook 44 by a distance sufficiently small as to disallow free movement of the eye 18 onto and off of the hook 44. Instead, as the eye is moved onto the hook, the cross bar 20 engages the inclined portion 74 and in doing so cams the detent member away from the hook 50 to allow the eye to move to the fully hooked condition shown in FIG. 3. Once the two parts are in the fully hooked condition, the forward portion 72 is engageable with the cross bar 20 to resist movement of the eye from the hook due to loads imposed on the fastener members during normal use. Nevertheless, when a sufficient but small manual force is applied between the hook member and the eye member in a deliberate effort to remove the eye from the hook, the cross bar 20 in engaging the inclined portion 72 of the spring detent member will cam the spring detent member away from the hook to allow the eye to again move to a unfastened condition such as shown in FIG. 1.

I claim:

1. A separable fastener in the form of a hook and eye type buckle, said fastener comprising: an eye member having a forward portion defining an eye, and a hook member, said hook member having a forward portion including a base of sheet material having front and back surfaces generally parallel to one another, a hook having a forward end fixed to said base and extending upwardly from said front surface and rearwardly from said forward end, said base having an opening passing therethrough and underlying said hook, a spring detent member fixed to said base and having a portion extending into said opening and arranged to be engageable with said eye when said eye is received on said hook in a fully hooked condition to yieldingly resist displacement of said eye from said hook, said spring detent member comprising a single strip of spring material folded upon itself so as to have two overlying legs, and a fastener passing through said base and at least one of said legs rearwardly of said opening for fixing said spring detent member to said base, said hook member including a rear portion in the form of a rearward continuation of said forward portion and including a transversely extending slot, at least one leg of said spring detent member having a rear end portion extending into said slot and engageable with the forward wall of said slot to prevent rotation of said spring detent member about the axis of said fastener.

2. A separable fastener in the form of a hook and eye type buckle, said fastener comprising: an eye member having a forward portion defining an eye, and a hook member, said hook member having a forward portion including a base of sheet material having front and back surfaces generally parallel to one another, a hook having a forward end fixed to said base and extending upwardly from said front surface and rearwardly from said forward end, said base having an opening passing therethrough and underlying said hook, a spring detent member fixed to said base and having a portion extending into said opening and arranged to be engageable with said eye when said eye is received on said hook in a fully hooked condition to yieldingly resist displacement of said eye from said hook, said portion of said spring detent member which extends into said opening being located, in the normal relaxed condition of said spring detent member, sufficiently close to said hook as to interfere with said eye during movement of said eye both into and out of said fully hooked condition with said hook, said portion of said detent member having a first cam surface which is engageable with said eye during movement of said eye onto said hook to cam said portion away from said hook to allow said eye to move into said fully hooked condition therewith and having a second cam surface engageable with said eye to cam said portion away from said hook to allow removal of said eye from said fully hooked condition with said hook, said spring detent member being attached to said base rearwardly of said opening, one of said legs of said spring detent member being longer than the other, and a fastener passing through said base and the longer one of said legs to fix said spring detent member to said base, the shorter one of said legs terminating short of said fastener, said longer leg of said spring detent member being said backmost leg of said spring, said backmost leg of said spring being located adjacent said back surface of said base, and said back surface of said base having adjacent said opening a groove receiving a part of said frontmost leg of said spring, said hook member including a rear portion in the form of a rearward continuation of said forward portion and including a transversely extending slot, said backmost leg portion of said spring detent member having a rear end portion extending into said slot and projecting upwardly so as to be engageable with the forward wall of said slot to prevent rotation of said spring detent member about the axis of said fastener.

3. A separable fastener as defined in claim 2 further characterized by said eye of said eye member including a forward transversely extending cross bar having a given dimension longitudinally of said eye member, and said hook of said hook member having a forward end portion which is directly connected to said base and which extends in a generally upward direction away from said base and an intermediate portion immediately following said forward end portion which intermediate portion extends in a generally rearward direction parallel to said base, said intermediate portion of said hook being spaced from said front surface of said base by a distance less than said longitudinal dimension of said forward cross bar of said eye so as to limit rotation of said eye member relative to said hook member when said eye is in said fully hooked condition with said hook.

4. A separable fastener in the form of a hook and eye type buckle, said fastener comprising: an eye member having a forward portion defining an eye, and a hook member, said hook member having a forward portion including a base of sheet material having front and back surfaces generally parallel to one another, a hook having a forward end fixed to said base and extending upwardly from said front surface and rearwardly from said forward end, said base having an opening passing therethrough and underlying said hook, and a spring detent member fixed to said base and having a portion extending into said opening and arranged to be engageable with said eye when said eye is received on said hook in a fully hooked condition to yieldingly resist displacement of said eye from said hook, said eye of said eye member including a forward transversely extending cross bar having a given dimension longitudinally of said eye member, and said hook of said hook member having a forward end portion which is directly connected to said base and which extends in a generally upward direction away from said base and an intermediate portion immediately following said forward end portion which intermediate portion extends in a generally rearward direction parallel to said base, said intermediate portion of said hook being spaced from said front surface of said base by a distance less than said longitudinal dimension of said forward cross bar of said eye so as to limit rotation of said eye member relative to said hook member when said eye is in said fully hooked condition with said hook.

5. A separable fastener in the form of a hook and eye type buckle, said fastener comprising: an eye member having a forward portion defining an eye, and a hook member, said hook member having a forward portion including a base of sheet material having front and back surfaces generally parallel to one another, a hook having a forward end fixed to said base and extending upwardly from said front surface and rearwardly from said forward end, said base having an opening passing therethrough and underlying said hook, and a spring detent member fixed to said base and having a portion extending into said opening and arranged to be engageable with said eye when said eye is received on said hook in a fully hooked condition to yieldingly resist displacement of said eye from said hook, said portion of said detent member having a first cam surface which is engageable with said eye during movement of said eye onto said hook to cam said portion away from said hook to allow said eye to move into said fully hooked condition therewith and having a second cam surface engageable with said eye to cam said portion away from said hook to allow removal of said eye from said fully hooked condition with said hook, said first cam surface being located forwardly of said second cam surface, said two cam surfaces meeting at a point directed upwardly toward said hook which point, in the normal relaxed condition of said spring detent member, is located sufficiently close to said hook as to cause said portion of said detent member to interfere with said eye during movement of said eye both into and out of said fully hooked condition with said hook, said first cam surface being inclined downwardly and forwardly from said point and said second cam surface being inclined downwardly and rearwardly from said point, and said hook extending rearwardly a substantial distance beyond said point of said detent member.

6. A separable fastener as defined in claim 5 further characterized by said hook having a forward end portion which is directly connected to said base and which extends in a generally upward direction from said base, an intermediate portion immediately following said forward end portion which intermediate portion extends in a generally rearward direction parallel to said base, and a rear end portion immediately following said intermediate portion which rear end portion extends generally upwardly and rearwardly from said intermediate portion, said point of said detent member being located approximately at the transition between said intermediate portion and said rear end portion of said hook.

* * * * *